United States Patent [19]

Kingman

[11] Patent Number: 5,147,706
[45] Date of Patent: Sep. 15, 1992

[54] WATER BASED INK ON FOIL AND/OR SYNTHETIC ORGANIC POLYMER

[76] Inventor: Kevin P. Kingman, 605 Zschokke, Highland, Ill. 62249

[21] Appl. No.: 636,048

[22] Filed: Dec. 31, 1990

[51] Int. Cl.$^5$ .............................................. B32B 9/00
[52] U.S. Cl. .................................... 428/195; 428/204; 428/206; 428/411.1; 428/457; 428/537.5
[58] Field of Search ............ 428/195, 204, 206, 411.1, 428/457, 537.5

[56] References Cited

FOREIGN PATENT DOCUMENTS 0142867  5/1985  European Pat. Off. .

OTHER PUBLICATIONS

CA 108(8) 58071 B, Shirato, Water Resistant Aqueous Inks.
CA 93(16) 151881 J, Kojima, Acrylic polymer water resistant ink.

*Primary Examiner*—Patrick J. Ryan

[57] ABSTRACT

An article of manufacture comprising a substrate of foil and/or synthetic organic polymer and a water-based ink affixed thereto which is water-resistant upon curing. A method of disposing a water-based, water-resistant ink on foil and/or synthetic organic polymer substrates.

18 Claims, No Drawings

WATER BASED INK ON FOIL AND/OR SYNTHETIC ORGANIC POLYMER

FIELD OF THE INVENTION

This application is generally directed to water based inks on foil and/or synthetic organic polymers, and, more specifically, water based inks that are water-resistant upon drying.

SUMMARY OF THE INVENTION

The present invention comprises an article of manufacture, comprising a substrate comprising foil, synthetic organic polymer, or combinations thereof, and an ink composition attached to at least a portion of the substrate. The ink composition in an uncured condition comprises water resistance agent having a glass transition point of about minus 40° C. to about 30° C.; a blocking agent having a glass transition point of about 30° C. to about 100° C.; an effective amount of a coloring agent capable of providing color to the composition; means for maintaining a basic pH in the composition; and an effective amount of aqueous solution to control the viscosity of the composition. The composition does not contain a hydrocarbon solvent.

The present invention also comprises a method of disposing a water-based ink composition on a foil and/or synthetic organic polymer substrate by disposing the previously described ink composition on the substrate.

DESCRIPTION OF THE PREFERRED EMBODIMENTS

Inks are useful in a wide variety of applications on various types of substrates. Inks may be used to print letters or designs on, or to impart color to a substrate. The selection of an ink with the appropriate properties is important when the substrate on which the ink is applied is subjected to unusual conditions. Some unusual conditions are the exposure of an ink treated substrate to water based fluids, exposure of an ink treated substrate to excessive friction from contact with a second substrate, and exposure of an ink treated substrate to ultraviolet radiation. The present invention provides an ink which is suitable for use on a substrate subjected to these and other unusual conditions.

Water resistant inks are required when the substrate on which the ink is applied may contact items containing water based fluids. For example, an ink treated substrate such as a synthetic polymer film or foil may be used to wrap wet cut flowers. The present invention provides the advantage of having immediate resistance to water upon drying.

If the ink used to treat the substrate is not sufficiently water resistant, then the water from the water containing item will cause the ink on the substrate to run. One way in which this problem has been solved in the past is to provide a water resistant ink utilizing hydrocarbon solvents.

Using hydrocarbon solvents such as alcohols, ketones or 1',1',1-trichloroethane in ink presents several problems such as proper disposal under government environmental regulations. For example, when the ink prepared with hydrocarbon solvents and/or the substrate on which the ink is applied is burned, volatile organic compounds (VOC) are released into the atmosphere causing pollution and ozone depletion. The Environmental Protection Agency has set strict guidelines for the disposal of these types of materials. Therefore, the disposal of these products can be costly in terms of money and the environment.

Another problem associated with ink prepared with hydrocarbon solvents is the propensity of the ink to rub off of the substrate when exposed to excessive friction from contact with a second substrate e.g., when the substrate comprises a long sheet of material stored as a roll of material, the ink on one portion of the sheet of material contactingly engages another portion of the rolled sheet.

Additionally, the ink prepared with hydrocarbon solvents can be adversely affected by ultraviolet radiation. When the purpose of applying the ink to a substrate is to enhance the aesthetic appeal of the substrate, the ability of the ink to remain on the substrate in substantially the same condition as when applied can affect the commercial viability of the entire product formed by the substrate.

Another disadvantage of using hydrocarbon solvents in the preparation of an ink is the cost. When a water-based solvent can replace the use of a hydrocarbon solvent, the cost of the preparation of the ink can be substantially reduced.

The present invention provides a water-based ink which is water resistant upon drying (curing). It is inexpensive to produce and provides better quality of color and design placement on selected substrates than hydrocarbon based inks, especially on substrates such as foils and synthetic organic polymers such as films comprising olefins. Upon burning, the ink of the present invention produces substantially 0% VOC according to EPA standards as interpreted by the state of Illinois as of 1990.

Substrates used in accordance with the present invention are any substrates on which the ink of the present invention can be disposed. Some examples of preferred substrates are water resistant substrates such as synthetic organic polymers such as films comprising olefins, foil, treated or untreated cellulose containing products such as paper or cellophane, treated or untreated natural and/or synthetic fabrics, and combinations of the foregoing.

If water resistance of the substrate is preferred, selected substrates normally not water resistant may be treated to resist water. Preferably, the substrate has been treated to be water-resistant, or is inherently water-resistant.

"Water resistant substrate" as used herein means any substrate which has any degree of water resistance. "Water resistance" means that at least a portion of a water based fluid will be repelled by the substrate. "Water resistant ink" means an ink which, upon drying to a suitable substrate, will not dissolve upon contact with a water containing item such as wet cut flowers.

The water-based ink of the present invention comprises an effective amount of a water resistance agent, a blocking agent, a coloring agent, and an effective amount of water for viscosity control. The ink composition has a basic pH of about 7.5 to about 14. A pH of 8.2–9.5 of the mixture is preferred, and, more preferably, a pH of 8.5–9.0. The composition may be any pH which maintains the stability of the system by permitting the ink to function as described herein. Any buffering agent may be used to provide the composition with a basic pH. In a preferred embodiment, an effective amount of ammonia is used to produce the desired pH.

The water resistance agent of the composition imparts water resistance to the composition, and may also aid the composition in adhering to the substrate. One example of a water resistance agent used in accordance with the present invention is an acrylic polymer emulsion such as Lucidene 603 from Morton Thiokol, Johncryl 74 from S. C. Johnson Wax or Grocryl 600 and 700 from Gropolymer.

Preferably, the water resistance agent has a low $T_g$ such as $-40°$ C. to about 30° C. A $T_g$ refers to the glass transition point. The water resistance agent is preferably in the composition from about 5% to about 99% by weight of the composition, and preferably from about 20% to about 70%, and more preferably from about 30% to about 60%.

The blocking agent of the present invention acts to prevent the transfer of the ink from the first substrate to which the ink is applied to a second substrate which contacts the dried ink. Preferably, the blocking agent comprises an acrylic latex polymer emulsion. More preferably, the blocking agent comprises an agent which has a relatively high $T_g$ such as 30° C.-100° C., and still is a natural film former at low temperatures.

By using a blocking agent with a high $T_g$ with a water resistance agent having a relatively lower $T_g$, water resistance and adhesion to hard surfaces such as polyolefin films and foils can be achieved without loss in gloss and clarity of the color, and without the need for a hydrocarbon solvent.

The blocking agent is preferably in the composition from about 1% to about 85% by weight of the composition, and preferably from about 10% to about 70%, and more preferably from about 10% to about 40%. A blocking agent used in a preferred embodiment is Lucidene 602 from Morton Thiokol (styrenated acrylic latex emulsion).

The coloring agent of the present invention may be any agent which can be mixed with the water resistance agent and the blocking agent of the present invention to provide a uniform color to the ink, and which has water resistant properties such that the ink will not run from the substrate once the ink has dried on the substrate. The coloring agent is preferably in the composition from 0.1% to 25% by weight of the composition. More preferably, the coloring agent is present in a composition from 0.1% to 14%, and most preferably, from 1.0% to 8.0% by weight of the composition. Preferred coloring agents used in accordance with the present invention are non-water based dyes and non-water based pigments. Some examples of coloring agents used in preferred embodiments are pigments such as lithol rubine or Flexiverse from Sun Chemical.

Normally, if a pigment is used, the pigment is commercially provided in a dispersion which contains a binder, water and an alkalizing agent such as ammonia. The pigment dispersion is mixed with water and then the water resistance agent added thereto. The blocking agent can then be added to the resulting mixture. Other methods of mixture may be utilized as long as the pigment is not shocked from the mixture. The pigment is "shocked" when it coagulates out of the mixture and becomes a large insoluble particle which causes color loss and filter plugging.

Other agents may be added to the composition of the present invention in a sufficient amount in order to facilitate application of the ink to the substrate. A buffer may be added in a sufficient amount in order to keep the solution basic. For example, amino-2 methylpropanol from Angus Chemical Company may be used for pH stabilization. Preferably, the buffer is in the amount of 0.1% to 5%, more preferably from 1.0% to 4%, and most preferably from 2% to 3% by weight of the composition. In a preferred embodiment, amino-2 methylpropanol is used in the composition of the present invention in an amount of 2.5% by weight of the composition.

A stabilization agent may be added to the composition of the present invention in a sufficient amount to enhance the ability of the ink to remain in the solution and prevent premature drying of the ink before being applied to the substrate. This stabilization agent is preferably an acrylic polymer such as Morez 100 from Morton Thiokol (styrene/acrylic resin). The stabilization agent is preferably present in the composition from 0.1% to 10%, more preferably from 1.0% to 3%, and most preferably from 2.5% to 3% by weight of the composition. In a preferred embodiment, Morez 100 is present in the composition of the present invention in the amount of 2.8% by weight of the composition.

A wax agent may be added to the composition of the present invention in a sufficient amount to help with rub off. "Rub off" means the ink coming off from substrate after drying. Any type of wax compatible with the composition of the present invention may be used, such as Polyethylene Wax Emulsion from Zinchem. The wax agent is present in the composition of the present invention from 0.1% to 15%, more preferably from 3% to 12%, and most preferably from 9% to 11% by weight of the composition. In a preferred embodiment, Polyethylene Wax Emulsion is present in the composition of the present invention in an amount of 10.4% by weight of the composition.

Additionally, a surface active agent such as a surfactant may be added to the composition of the present invention in a sufficient amount in order to improve lay down of the inks. By improving the "lay down of the ink", the cured surface of the ink is smooth, not grainy, to the touch. Although any surfactant which improves the lay down of the inks may be used, preferably the surfactant is sufficiently water resistant or not water soluble in order to prevent the running of the surfactant from the ink when contacted by water on the substrate. An example of an acceptable surfactant utilized in the present invention is Surfynol 104 from Air Products (2,4,7,9-tetramethyl-5-decyne-4,7-diol). The surfactant is present in the composition from 0.1% to 6%, and more preferably 1% to 5%, and most preferably from 1% to 3% by weight of the composition. In a preferred embodiment, Surfynol 104 is present in the composition of the present invention in an amount of 1.6% by weight of the composition.

A slip agent may be added to the composition of the present invention in an effective amount to enhance the reduction in friction ("slip") between substrates such as rolls or sheets of material. One example of a slip agent compatible with the composition of the present invention is No-Stik 812 from Ross Chemical Company (Polydimethylsiloxane emulsion). The slip agent is present in the composition of the present invention from 0.05% to 2%, and more preferably from 0.1% to 0.5%, and most preferably from 0.1% to 0.5% by weight of the composition. In a preferred embodiment, No-Stik 812 is present in the composition of the present invention in an amount of 0.3% by weight of the composition.

A defoaming agent may be added to the composition of the present invention in an effective amount to control any foam present in the composition which might interfere with the application of the ink to the substrate. Generally, about 0.01% to about 0.5%, and more preferably about 0.05% to about 0.3% by weight of composition of a defoaming agent is an effective amount. An example of a defoamer compatible with the composition of the present invention is Byk-035 from Byk Chemie Company. Certain types of defoaming agents which cause "fish eye" or "orange peel effect" should not be used with the composition of the present invention. "Fish eye" is a term used in applying an ink design to a substrate wherein a portion of the design is not affixed to the substrate. These void areas often have the configuration of a fish eye. "Orange peel" effect is a term used to denote a rough surface provided by the ink. Some silicone defoamers may produce fish eye and/or orange peel effects when used with the present invention.

A viscosity control agent may be added to the composition of the present invention. Preferably, the viscosity control agent does not contain substantial organic materials. A preferred viscosity control agent is water. The amount of water used with the composition of the present invention will depend upon the desired viscosity of the composition.

The composition of the present invention may be applied to the substrate in any appropriate manner. The method of application may be manual or mechanical. If the substrate forms sheets or an elongated sheet which may form a roll then gravure, flexographic procedures, or Mayer rod procedures may be used.

The substrate may be formed into any article of manufacture. Some examples of "articles of manufacture" are flower pot covers as described in U.S. Pat. No. 4,773,182 issued to Weder et al. on Sep. 27, 1988 entitled ARTICLE FORMING SYSTEM, hereby incorporated herein, and sheets or rolls of wrapping material for gifts or floral groupings.

The following examples illustrate the practice of preferred embodiments of the present invention. The present invention is not limited to the specific examples cited.

EXAMPLE 1

The following is an example of a burgundy ink of the present invention applied to foil by the direct gravure coating method.

Step #1: Prepare the lacquer which consists of Part A and Part B.

Part A

Weigh 240 lbs. of water in to a 50 gallon epoxy lined steel drum with a Lightning mixer attached. Turn on the Lightning mixer at approximately 1,000 rpm. Add 120 lbs. of Morcryl 100 slowly while mixer is on. Mix for 10 minutes. While still mixing add 40 lbs. of the AMP-95 (aminomethylpropanol) from Angus Chemical. Mix for 30 minutes or until solution is clear.

Part B

Place 1900 lbs. Lucidene 603 in a 500 gallon stainless steel mixing tank. Weigh 1,425 lbs. Lucidene 602 from Morton Thiokol into the tank and start the Lightning mixer at 800-1,000 rpm. Add 70 lbs. of AMP-95 and mix for 10 minutes. Turn the mixer off and add the following material in any order: part one solution; 450 lbs. of Zinpol 20 wax (polyethylene wax) from Zinchem; 70 lbs. of Surfynol 104e surfactant (2,4,7.9-tetramethyl-5-decyne-4,7-diol) from Air Products; 13 lbs. of No-Stik 812 slip agent (polydimethylsiloxane emulsion) from Ross Chemical Company; and 13 lbs. of BYK-035 defoamer (fatty acid ester) from Byk Chemie. Turn on the mixer for 30 minutes.

Step #2: Mixing of the ink.

A Lightning mixer is placed on a 55 gallon epoxy lined drum. A yellow pigment (6.6 lbs.), a red pigment (12.0 lbs.), a white pigment (4.0 lbs.), and a black pigment (2.4 lbs.) are placed in the drum. Pigments were obtained from Heucotech. The mixer is turned on to a low rpm to mix the pigments until smooth and consistent. While still mixing, 6.5 lbs. of water are added and mixed. While still mixing slowly, 68.5 lbs. of lacquer are added. The mixer is turned to 1,000 rpm for 10 minutes. The viscosity is adjusted to 11-13 second #3 Zahn Cup.

Step #3: Application of the ink.

The mixer is removed and a pump is attached to the drum. The ink is pumped into a stainless steel pan and constantly recirculated back to the drum. The ink is applied by Rotogravure using a 200 Quad Roto Flo knurl from Pamarco to 65 gauge (0.0065") virgin foil at speeds of 300-350 fpm.

Step #4: Formation of a flower pot cover.

The color treated foil of Step #3 may be formed into a flower pot cover using the method described in U.S. Pat. No. 4,773,182 issued Sep. 27, 1988 to Weder et al. entitled ARTICLE FORMING SYSTEM.

Changes may be made in the elements and steps described herein without departing from the spirit and scope of the invention as defined in the following claims.

What is claimed is:

1. An article of manufacture, comprising:
   a substrate comprising foil, synthetic organic polymer or combinations thereof; and
   a water-based ink composition affixed to at least a portion of the substrate, the ink composition being water-resistant upon curing, the ink composition in an uncured condition comprising:
   about 5% to 99% by weight of composition of a water resistance agent comprising an acrylic polymer emulsion;
   about 1% to about 85% by weight of composition of a blocking agent having a glass transition point of about 30° C. to about 100° C.;
   an effective amount of a coloring agent capable of providing color to the composition the coloring agent being present in the composition from about 0.1% to about 14% by weight of the composition;
   means for maintaining a basic pH in the composition; and
   an effective amount of an aqueous solution to control the viscosity of the composition, with the proviso that the composition substantially does not contain a hydrocarbon solvent.

2. An article of manufacture, comprising:
   a substrate comprising foil, synthetic organic polymer or combinations thereof; and
   a water-based inked composition affixed to at least a portion of the substrate, the ink composition being water-resistant upon curing, the ink composition in an uncured condition comprising:

about 5% to 99% by weight of composition of a water resistance agent having a glass transition point of about minus 40° C. to about 30° C.;

about 1% to about 85% by weight of composition of a blocking agent comprising a styrenated acrylic latex emulsion having a glass transition point of about 30° C. to about 100° C.;

an effective amount of a coloring agent capable of providing color to the composition the coloring agent being present in the composition from about 0.1% to about 14% by weight of the composition;

means for maintaining a basic pH in the composition; and an effective amount of an aqueous solution to control the viscosity of the composition, with the proviso that the composition substantially does not 3. An article of manufacture, comprising:

a substrate comprising foil, synthetic organic polymer or combinations thereof; and a water-based inked composition affixed to at least a portion of the substrate, the ink composition being water-resistant upon curing, the ink composition in an uncured condition comprising:

about 5% to 99% by weight of composition of a water resistance agent having a glass transition point of about minus 40° C. to about 30° C.;

about 1% to about 85% by weight of composition of a blocking agent having a glass transition point of about 30° C. to about 100° C.;

an effective amount of a coloring agent capable of providing color to the composition the coloring agent being present in the composition from about 0.1% to about 14% by weight of the composition;

means for maintaining a basic pH in the composition; and an effective amount of an aqueous solution to control the viscosity of the composition, with the proviso that the composition substantially does not contain a hydrocarbon solvent;

wherein the ink composition has a pH of about 7.5 to about 14.

4. An article of manufacture, comprising:

a substrate comprising foil, synthetic organic polymer or combinations thereof; and a water-based ink composition affixed to at least a portion of the substrate, the ink composition being water-resistant upon curing, the ink composition in an uncured condition comprising:

about 5% to 99% by weight of composition of a water resistance agent having a glass transition point of about minus 40° C. to about 30° C.;

about 1% to about 85% by weight of composition of a blocking agent having a glass transition point of about 30° C. to about 100° C.;

an effective amount of a coloring agent capable of providing color to the composition the coloring agent being present in the composition from about 0.1% to about 14% by weight of the composition;

means for maintaining a basic pH in the composition; and an effective amount of an aqueous solution to control the viscosity of the composition, with the proviso that the composition substantially does not contain a hydrocarbon solvent;

wherein the ink composition has a pH of about 8.2 to

5. An article of manufacture, comprising:

a substrate comprising foil, synthetic organic polymer or combinations thereof; and a water-based ink composition affixed to at least a portion of the substrate, the ink composition being water-resistant upon curing, the ink composition in an uncured condition comprising:

about 5% to 99% by weight of composition of a water resistance agent having a glass transition point of about minus 40° C. to about 30° C.;

about 1% to about 85% by weight of composition of a blocking agent having a glass transition point of about 30° C. to about 100° C.;

an effective amount of a coloring agent capable of providing color to the composition the coloring agent being present in the composition from about 0.1% to about 14% by weight of the composition;

means for maintaining a basic pH in the composition; and an effective amount of an aqueous solution to control the viscosity of the composition, with the proviso that the composition substantially does not contain a hydrocarbon solvent; and wherein the ink composition has a pH of about 8.5 to about 9.0.

6. An article of manufacture, comprising:

a substrate comprising foil, synthetic organic polymer or combinations thereof; and a water-based inked composition affixed to at least a portion of the substrate, the ink composition being water-resistant upon curing, the ink composition in an uncured condition comprising:

about 5% to 99% by weight of composition of a water resistance agent having a glass transition point of about minus 40° C. to about 30° C.;

about 1% to about 85% by weight of composition of a blocking agent having a glass transition point of about 30° C. to about 100° C.;

an effective amount of a coloring agent comprising pigments capable of providing color to the composition the coloring agent being present in the composition from about 0.1% to about 14% by weight of the composition;

means for maintaining a basic pH in the composition; and an effective amount of an aqueous solution to control the viscosity of the composition, with the proviso that the compositions substantially does not contain a hydrocarbon solvent.

7. An article of manufacture, comprising:

a substrate comprising foil, synthetic organic polymer or combinations thereof; and a water-based ink composition affixed to at least a portion of the substrate, the ink composition being water-resistant upon curing, the ink composition in an uncured condition comprising:

about 5% to 99% by weight of composition of a water resistance agent having a glass transition point of about 30° C. to about 100° C.;

about 1% to about 85% by weight of composition of a blocking agent having a glass transition point of about 30° C. to about 100° C.;

an effective amount of a coloring agent capable of providing color to the composition the coloring agent being presenting the composition from about 0.1% to about 14% by weight of the composition;

means for maintaining a basic pH in the composition;

an effective amount of an aqueous solution to control the viscosity of the composition, with the proviso that the composition substantially does not contain a hydrocarbon solvent; and about 0.1% to about 10% by weight of the composition of a stabilizing agent capable of enhancing the solubilization of the agents of the composition.

8. An article of manufacture, comprising:

a substrate comprising foil, synthetic organic polymer or combinations thereof; and a water-based ink composition affixed to at least a portion of the substrate, the ink composition being water-resistant upon curing, the ink composition in an uncured condition comprising:

about 5% to 99% by weight of composition of a water resistance agent having a glass transition point of about 30° C. to about 100° C.;

about 1% to about 85% by weight of composition of a blocking agent having a glass transition point of about 30° C. to about 100° C.;

an effective amount of a coloring agent capable of providing color to the composition the coloring agent being present in the composition from about 0.1% to about 14% by weight of the composition;

means for maintaining a basic pH in the composition; and an effective amount of an aqueous solution to control the viscosity of the composition, with the proviso that the composition substantially does not contain a hydrocarbon solvent; and about 0.1% to about 15% by weight of a composition of a wax agent capable of enhancing the ability of the composition to prevent rub off of cured composition from the substrate.

9. An article of manufacture, comprising:

a substrate comprising foil, synthetic organic polymer or combinations thereof; and a water-based inked composition affixed to at least a portion of the substrate, the ink composition being water-resistant upon curing, the ink composition in an uncured condition comprising:

about 5% to 99%by weight of composition of a water resistance agent having a glass transition point of about 30° C. to about 100° C.;

about 1% to about 855 by weight of composition of a blocking agent having a glass transition point of about 30° C. to about 100° C.;

an effective amount of a coloring agent capable of providing color to the composition the coloring agent being present in the composition from about 0.1% to about 14% by weight of the composition;

means for maintaining a basic pH in the composition; and an effective amount of an aqueous solution to control the viscosity of the composition, with the proviso that the composition substantially does not contain a hydrocarbon solvent; and about 1% to about 5% of a surfactant.

10. An article of manufacture, comprising:

a substrate comprising foil, synthetic organic polymer or combinations thereof; and a water-based ink composition affixed to at least a portion of the substrate, the ink composition being water-resistant upon curing, the ink composition in an uncured condition comprising:

about 5% to 99% by weight of composition of a water resistance agent having a glass transition point of about 30° C. to about 100° C.;

about 1% to about 85% by weight of composition of a blocking agent having a glass transition point of about 30° C. to about 100° C.;

an effective amount of a coloring agent capable of providing color to the composition the coloring agent being present in the composition from about 0.1% to about 14% by weight of the composition;

means for maintaining a basic pH in the composition; and an effective amount of an aqueous solution to control the viscosity of the composition, with the proviso that the composition substantially does not contain a hydrocarbon solvent; and about 0.05% to about 2% by weight of composition of a slip agent capable of reducing the amount of friction between the substrate and a second substrate which contactingly engages the composition on the substrate.

11. An article of manufacture, comprising:

a substrate comprising foil, synthetic organic polymer or combinations thereof; and a water-based inked composition affixed to at least a portion of the substrate, the ink composition being water-resistant upon curing, the ink composition in an uncured condition comprising:

about 5% to 99% by weight of composition of a water resistance agent having a glass transition point of about 30° C. to about 100° C.;

about 1% to about 85% by weight of composition of a blocking agent having a glass transition point of about 30° C. to about 100° C.;

an effective amount of a coloring agent capable of providing color to the composition the coloring agent being present in the composition from about 0.1% to about 14% by weight of the composition;

means for maintaining a basic pH in the composition;

an effective amount of an aqueous solution to control the viscosity of the composition, with the proviso that the composition substantially does not contain a hydrocarbon solvent; and an effective amount of defoaming agent capable of reducing the amount of foam present in the uncured ink 12. An article of manufacture, comprising:

a substrate comprising foil, synthetic organic polymer or combinations thereof, the substrate comprising an elongated sheet of material rolled over itself to form a roll of material; and a water-based ink composition affixed to at least a portion of the substrate, the ink composition being water-resistant upon curing.

13. An article of manufacture, comprising:

a substrate comprising foil, synthetic organic polymer or combinations thereof, wherein the substrate comprises a plurality of sheets of material stacked on top of each other; and a water-based ink composition affixed to at least a portion of the substrate, the ink composition being water-resistant upon curing.

14. An article of manufacturing, comprising:

a substrate comprising foil, synthetic organic polymer or combinations thereof, wherein the substrate comprises a sheet of material capable of forming a flower opt cover; and a water-based ink composition affixed to at least a portion of the substrate, the ink composition being water-resistant upon curing.

15. An article of manufacture, comprising:

a substrate comprising foil, synthetic organic polymer or combinations thereof, wherein the substrate comprises a sheet of material capable of being wrapped about a floral arrangement; and a water-based ink composition affixed to at least a portion of the substrate, the ink composition being water-resistant upon curing.

16. The article of claim 7 in which the stabilizing agent comprises a styrene acrylic resin.

17. The article of claim 9 in which the surfactant comprises 2,4,7,9-tetramethyl-5-decyne-4,7-diol.

18. The article of claim 10 in which the slip agent comprises a polydimethylsiloxane emulsion.

* * * * *

UNITED STATES PATENT AND TRADEMARK OFFICE
CERTIFICATE OF CORRECTION

PATENT NO. : 5,147,706

DATED : September 15, 1992

INVENTOR(S) : Kevin P. Kingman

It is certified that error appears in the above-identified patent and that said Letters Patent is hereby corrected as shown below:

Column 7, Line 18, after the word "not" add --contain a hydrocarbon solvent.--

Column 8, Line 2, after the word "to" add --about 9.5.--

Column 8, Line 62, delete "30°C. to about 100°C." and replace with --minus 40°C. to about 30°C.--

Column 9, Line 22 delete "30°C. to about 100°C." and replace with --minus 40°C. to about 30°C.--

Column 9, Line 50, delete "30°C. to about 100°C." and replace with --minus 40°C. to about 30°C.--

Column 9, Line 51, delete "855" and replace with --85%--

Column 10, Line 7, delete "30°C. to about 100°C." and replace with --minus 40°C. to about 30°C.--

Column 10, Line 37, delete "30°C. to about 100°C." and replace with --minus 40°C. to about 30°C.--

UNITED STATES PATENT AND TRADEMARK OFFICE
CERTIFICATE OF CORRECTION

PATENT NO.  : 5,147,706
DATED       : September 15, 1992
INVENTOR(S) : Kevin P. Kingman It is certified that error appears in the above-indentified patent and that said Letters Patent is hereby corrected as shown below:

Column 10, line 55, after the word "ink" add --composition--.

Signed and Sealed this

Ninth Day of November, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,147,706
DATED : September 15, 1992
INVENTOR(S) : Kevin P. Kingman Page 1 of 1

It is certified that error appears in the above-identified patent and that said Letters Patent is hereby corrected as shown below:

On the title page, after "[76] Inventor: Kevin P. Kingman, 605 Zschokke, Highland, Ill. 62249", please insert the following section, --[73] Assignee: Highland Supply Corporation, Highland, Ill.--.

Signed and Sealed this

Twenty-fifth Day of October, 1994

Attest:

BRUCE LEHMAN

Attesting Officer

Commissioner of Patents and Trademarks